United States Patent
Hymel et al.

(10) Patent No.: US 9,286,168 B2
(45) Date of Patent: Mar. 15, 2016

(54) SPARING METHOD AND APPARATUS

(71) Applicant: ARRIS Enterprises, Inc., Suwanee, GA (US)

(72) Inventors: Darryl P. Hymel, Batavia, IL (US); Thomas J. Cloonan, Lisle, IL (US)

(73) Assignee: ARRIS Enterprises, Inc., Suwanee, GA (US)

(*) Notice: Subject to any disclaimer, the term of this patent is extended or adjusted under 35 U.S.C. 154(b) by 154 days.

(21) Appl. No.: 14/247,347

(22) Filed: Apr. 8, 2014

(65) Prior Publication Data
US 2015/0286543 A1 Oct. 8, 2015

(51) Int. Cl.
*G06F 11/00* (2006.01)
*G06F 11/20* (2006.01)

(52) U.S. Cl.
CPC ........ *G06F 11/2007* (2013.01); *G06F 11/2002* (2013.01); *G06F 2201/85* (2013.01)

(58) Field of Classification Search
CPC ......... H04L 1/22; H04L 12/437; H04L 12/26; H04L 25/028; H04L 25/0292; H04L 45/22; G06F 11/2007; G06F 13/4247; G06F 11/00; G06F 11/076; G06F 11/2033; G06F 11/2038; G06F 11/2041; G06F 13/4022; G06F 2201/85
See application file for complete search history.

(56) References Cited

U.S. PATENT DOCUMENTS

| | | | |
|---|---|---|---|
| 6,449,249 B1 | 9/2002 | Cloonan et al. | |
| 6,662,368 B1 | 12/2003 | Cloonan et al. | |
| 2012/0151247 A1* | 6/2012 | Ferraiolo | H04L 1/22 714/4.5 |

* cited by examiner

*Primary Examiner* — Jason Bryan
(74) *Attorney, Agent, or Firm* — Lori Anne D. Swanson

(57) ABSTRACT

A device and method for routing separate data flows to subscribers on a content distribution network are provided. The device includes a group of access modules having signal processing circuitry each coupled to a corresponding interface unit. The interface units are coupled in a daisy chain configuration. The access modules include at least first and second active access modules and a spare access module. The group being configured for normal mode operation in which the first active access module processes a first data flow and the second active access module processes a second data flow, and the group being configured for sparing event mode operation in which the first data flow is automatically switched to the second active access module and the second data flow is automatically switched to the spare access module.

20 Claims, 10 Drawing Sheets

US 9,286,168 B2

SPARING METHOD AND APPARATUS

BACKGROUND

Broadband network operators, such as multiple system operators (MSOs), distribute and deliver services and content, such as video, audio, and multimedia content, to subscribers or end-users. For example, a broadband cable network MSO may connect to provider resources for transmitting digital video broadcasts, digital data Internet Protocol Television (IPTV) services, non-linear services such as video-on demand (VOD) services, Internet or high speed data services, voice-over-IP services, and the like.

For purposes of providing these services to consumers, equipment generally referenced as routers, edge routers, or the like interconnect the content distribution network with other service providing networks, such as the Internet, and like resources. As an example, a cable modem termination system (CMTS) is a piece of equipment which has been located at a headend or hub site of a MSO's facility and is used to provide high speed data services, such as cable Internet or voice over Internet Protocol, to cable subscribers.

The MSO connects its headend to the Internet via very high capacity data links to a network service provider and, on the subscriber side of the headend, the CMTS communicates with customer premises equipment (CPE) such as cable modems. Thus, the CMTS may have Ethernet interfaces (connections) to the Internet or other resources on one side and radio frequency (RF) interfaces on the other side which exchange RF signals providing modulated content with CPE. Cable distribution networks have traditionally used quadrature amplitude modulation (QAM) schemes provided by so-called edge QAMs, although other modulation schemes may be used.

In addition, headend and hub site equipment may also be provided with so-called Converged Cable Access Platform (CCAP) architecture. CCAP equipment combines edge QAM devices and CMTS technology into one device converged in an all-in-one CMTS/QAM platform. Such a device is able to provide router and modulation functions for all services that may be provided by a MSO in single piece of equipment to a given population of CPEs.

When any part, card or interface of any of the above referenced equipment fails, the potential exists for customers or subscribers to lose services or be subject to temporary service interruptions. The use of redundant components and self-healing architecture aids in the goal of maintaining services without interruption.

BRIEF DESCRIPTION OF THE DRAWINGS

Various features of the embodiments described in the following detailed description can be more fully appreciated when considered with reference to the accompanying figures, wherein the same numbers refer to the same elements.

DETAILED DESCRIPTION

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In some instances, well known methods and structures have not been described in detail so as not to unnecessarily obscure the embodiments.

Figure 1:
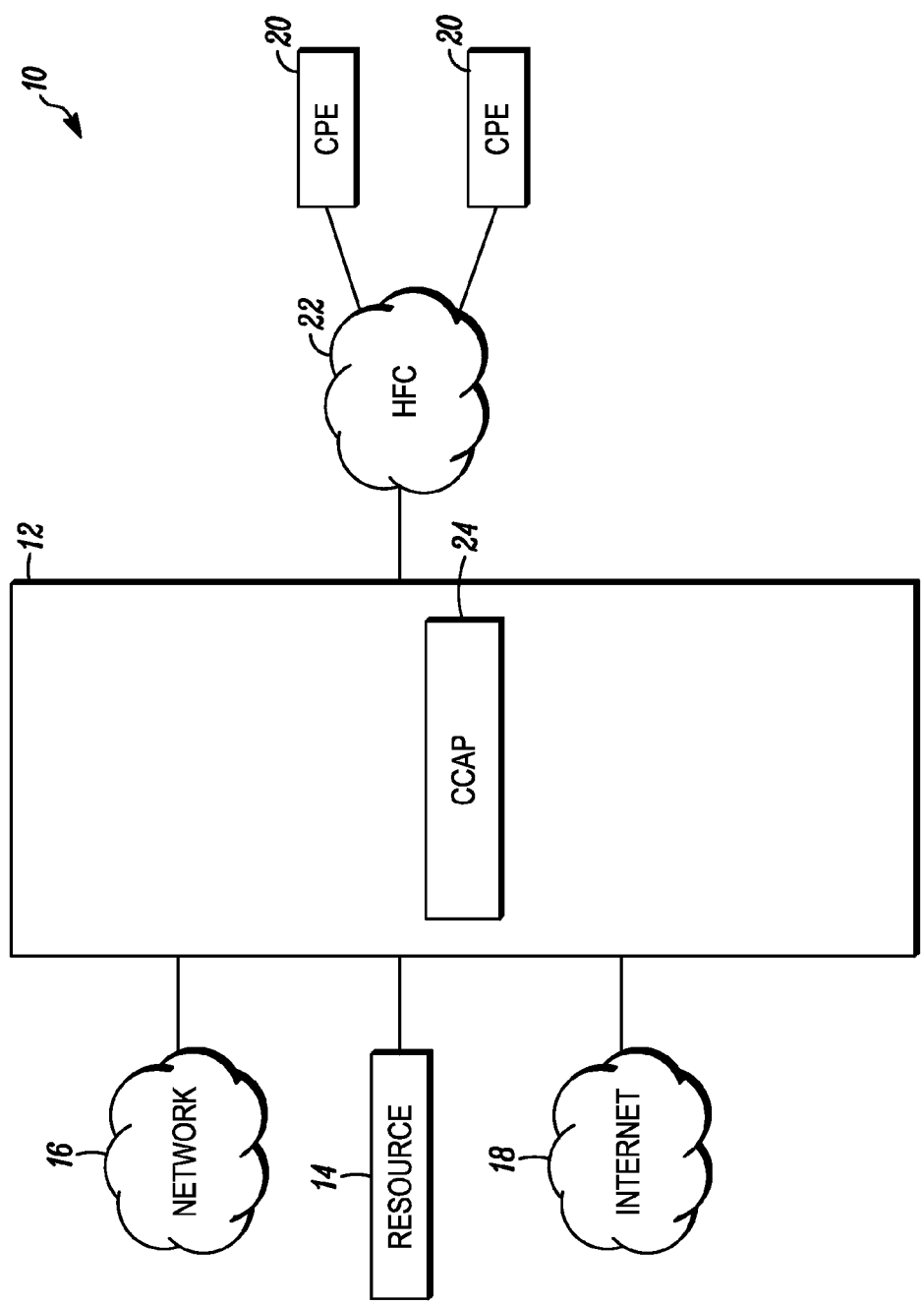
FIG. 1 is a simplified diagram of a content distribution network in accordance with an embodiment.

FIG. 1 is a simplified diagram of a content distribution network 10 in accordance to an embodiment. The headend 12 is controlled by an MSO and is utilized to obtain content from various content resources 14, networks 16, the Internet 18, and the like and to deliver the content to customer premises equipment (CPE) 20 via network infrastructure 22, such as a hybrid fiber coaxial (HFC) network. The headend 12 may include, for instance, a CCAP device 24 providing a single combined CMTS/QAM platform.

Provider content (such as digital video, data, etc.) is subjected to processing, such as modulation or the like, by the CCAP device 24 at the headend 12 and travels on a downstream path as a RF signal on the HFC network 22 to one or more CPEs 20 and modulated information travels upstream as RF signal on the HFC network 22 from the CPEs 20 to the CCAP device 24 which may demodulate the RF signal and forward information or the like to provider resources or the Internet.

Figure 2:
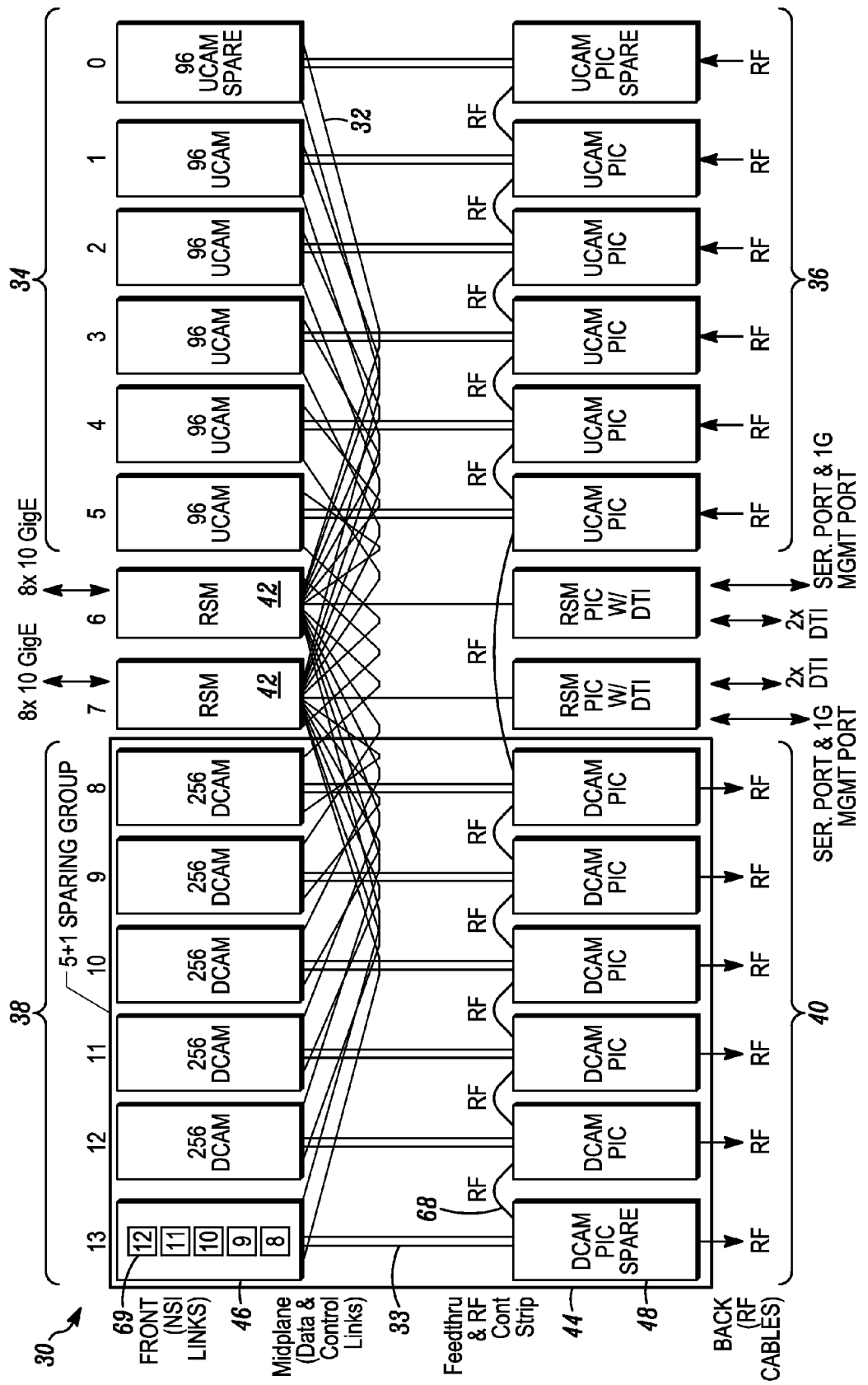
FIG. 2 is a block diagram of slot and mid-plane architecture of a CCAP device in accordance with an embodiment.

For purposes of example, a contemplated form of providing redundant and self-healing architecture for a CCAP device or like device is shown in FIG. 2. The device 30 includes a chassis (not shown) having fourteen slots (labeled 0 to 13 in FIG. 2) for circuit cards or the like on either side of a mid-plane circuit board providing data and control links 32. Slots 0 to 5 on the right side of FIG. 2 provide upstream cable access modules (UCAM) 34 and upstream cable access module physical interface cards (UCAM-PIC) 36. Slots 8-13 on the left side of FIG. 2 provide downstream cable access modules (DCAM) 38 and downstream cable access module physical interface cards (DCAM-PIC) 40. The UCAM-PICs 36 and DCAM-PICs 40 connect to the HFC network on the subscriber side of the headend and transfer RF signals to and from CPE. Slots 6 and 7 in the center of FIG. 2 provide redundant router system modules (RSM) 42 which control the operation of the device 30 including detecting for faulty UCAMs 34 and DCAMs 38 and routing the flow of signals to external resources and networks on the provider side of the headend.

Referring specifically to the downstream side of FIG. 2, a N+1 sparing group 44 is provided. In FIG. 2, the DCAM 46 and DCAM PIC 48 pairing in slot 13 of device 30 are provided as a spare to provide redundancy should one of the active cards in the device 30 fail. Thus, the device 30 can operate in a so-called normal mode of operation (i.e., without fault in which the spare is inactive) and in a so-called sparing event mode of operation (i.e., in which the spare becomes active due to a fault detected in one of the other cards).

Figure 3:
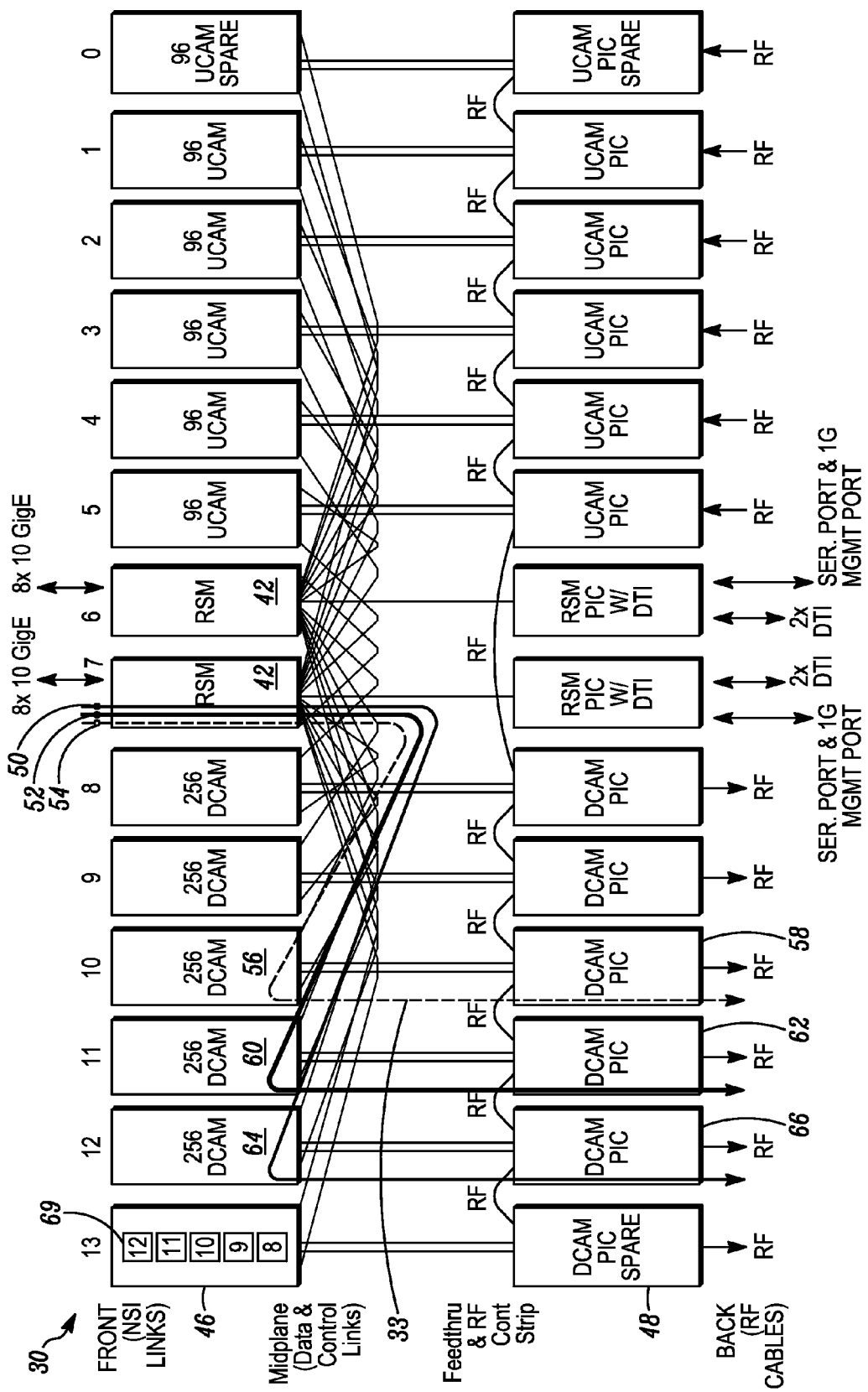
FIG. 3 is a block diagram of slot and mid-plane architecture of a CCAP device in a normal mode of operation in accordance with an embodiment.

FIG. 3 shows the downstream part of the device 30 operating in a normal mode. Here, the paths 50, 52 and 54 of three separate downstream data flows are shown. Downstream data flow path 50 travels from the RSM 42 to DCAM 56 in slot 10 via data links 32 in the mid-plane. The data stream is subject to processing by signal processing circuitry of DCAM 56. The path 50 extends via a RF feed-through 33 to DCAM-PIC 58 which forms a direct pairing with DCAM 56. DCAM-PIC 58 includes an output from which an RF signal is sent into the HFC network and ultimately to the intended CPE or CPEs. Paths 52 and 54 are similar, except these paths travel through a DCAM 60/DCAM-PIC 62 pairing in slot 11 and a DCAM 64/DCAM-PIC 66 pairing in slot 12. For purpose of this example, this provides "normal" flow conditions and permits the DCAM 46/DCAM-PIC 48 pairing to remain as an unused spare.

Figure 4:
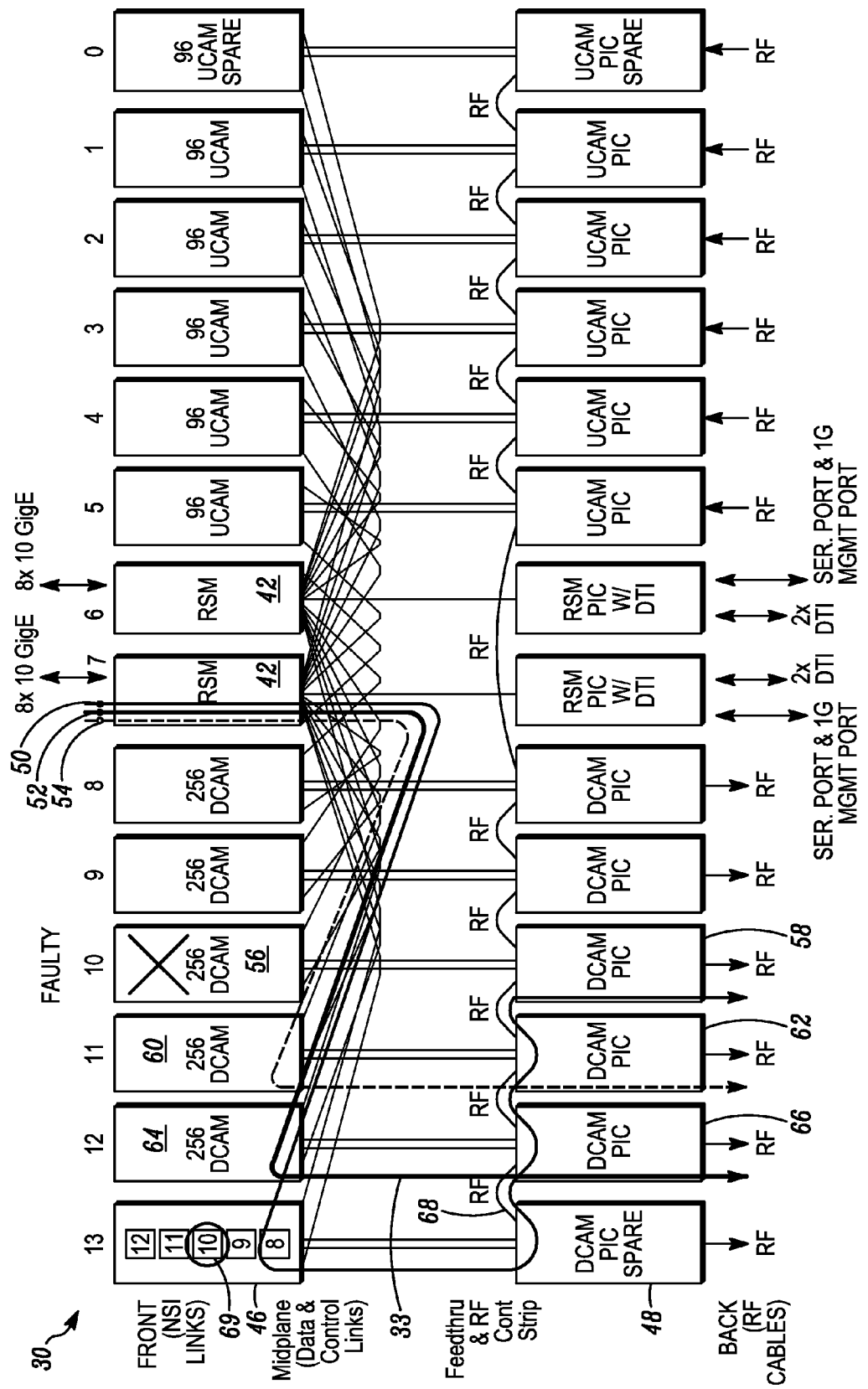
FIG. 4 is a block diagram of slot and mid-plane architecture of a CCAP device in a sparing event mode of operation in accordance with an embodiment.

FIG. 4 represents an occurrence of a fault in DCAM 56 and operation in a sparing event mode. As shown in FIG. 4, paths 52 and 54 are unchanged. However, since a fault is detected, such as by RSM 42, DCAM 56 is taken out of service. In this event, the DCAM 46 provides a spare and the path 50 is rerouted through DCAM 46 and then fed through the mid-plane of the device 30 to DCAM-PIC 48. It should be noted that DCAM 46 forms the only spare for all DCAMs in the N+1 sparing group 44.

Although the path 50 travels through DCAM-PIC 48 during a sparing event mode of operation, the RF signal associated with path 50 must ultimately be output at the same DCAM-PIC as output during the normal mode of operation. Thus, in this example, the path 50 must be output through DCAM-PIC 58 which is paired with the faulted DCAM 56. For purposes of providing this transfer, all of the DCAM-PICs are connected via a connection strip in a daisy chain configuration 68. In the illustrated embodiment, there are five links (connections) in the daisy chain 68 interconnecting the six DCAM-PICs. Accordingly, the RF signal from DCAM 46 must passes through its corresponding DCAM-PIC 48 and then through three links of the daisy chain 68 before being output by DCAM-PIC 58. Although only three paths 50, 52 and 54 were illustrated and discussed in this example, all five DCAMs 38 could be active with DCAM 46 providing the only spare (i.e., in the 5+1 sparing group 44).

According to the above referenced sparing approach, the spare RF signal is required to be propagated over a potentially long daisy chain, particularly for an N+1 sparing group including many active modules (i.e., N equals the number of active modules). Thus, the signal may be required to propagate across a full set of connectors from the spare DCAM 46 to the spare DCAM PIC 48 and then across N sets of connectors (worst case) through the daisy chain 68. This may lead to increased attenuation (as some attenuation is picked up in each daisy chain hop or link) and increased cross-talk (due to imperfect signal isolations in each daisy chain hop or link). This negatively impacts the Signal Level (S) and the Noise Level (N) to undesirably reduce the signal-to-noise ratio (SNR) of the signal.

For purposes of accommodating the power attenuation described above, high-powered amplifiers may be required on each of the DCAMs to drive the RF signals with higher power (to compensate for the loss of the daisy chain). However, this leads to higher board power requirements, elevated thermal issues, and higher overall manufacturing and operational costs of the DCAM.

Further, the above referenced sparing approach requires the spare DCAM to store state information for all of the active DCAMs in the sparing group. For instance, see the five sets of state information that must be stored in memory 69 in DCAM 46 or otherwise be acquired by DCAM 46 after occurrence of a fault. The state information includes channel configurations and active service flow configurations and would be unique for each active DCAM. This storage requirement of the one spare DCAM for N number of active DCAMs necessarily increases memory requirements and thus the cost of the spare DCAM card. Still further, this necessarily requires the spare DCAM to be ready to spare for any of the active DCAM cards in an instance without former notice. Accordingly, any switch to spare DCAM operation will be subject to a delay for a period of time needed by the spare DCAM to select and load appropriate stored state information stored in pertinent registers in hardware to switch to any one of the N number of active DCAMs. Here, the delay in switch-over is caused by the need to begin loading registers after having received a request for sparing.

Figure 5:
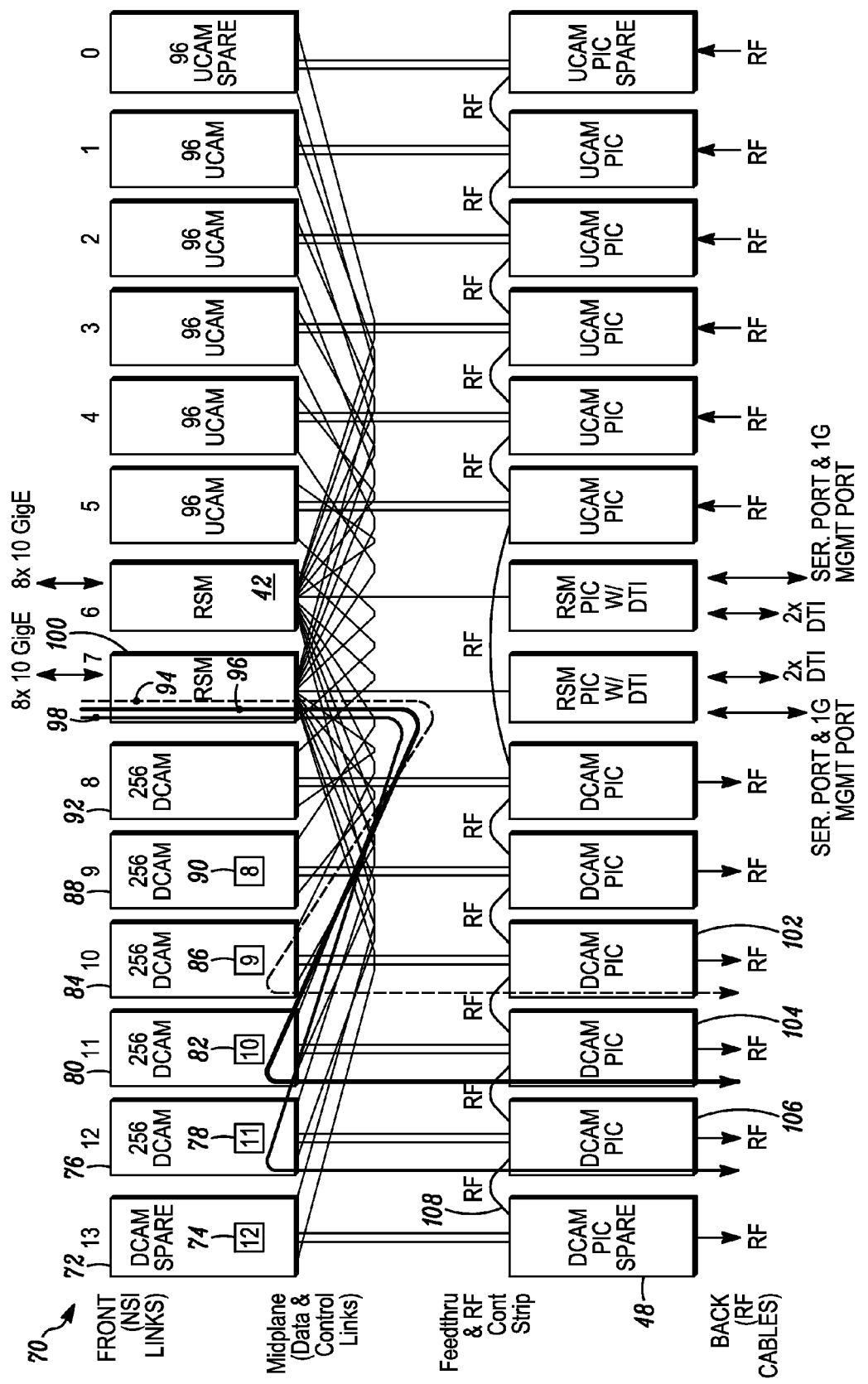
FIG. 5 is a block diagram of slot and mid-plane architecture of a CCAP device in a normal mode of operation in accordance with a second embodiment.

For all the above reasons, an alternate sparing approach is described below which better addresses the above referenced problems. The device 70 shown in FIG. 5 is similar to device 30, except the spare DCAM 72 in slot 13 only stores state information in standby registers 74 for providing a spare to active DCAM 76 provided in slot 12. Another difference is that active DCAM 76 stores state information in standby registers 78 for DCAM 80 provided in slot 11, DCAM 80 stores state information in standby registers 82 for DCAM 84 provided in slot 10, DCAM 84 stores state information in standby registers 86 for DCAM 88 provided in slot 9, and DCAM 88 stores state information in standby registers 90 for DCAM 92 provided in slot 8. Thus, in this example, each adjacent DCAM, including currently active DCAMs, provide sparing for an adjacent active DCAM.

Downstream data flow paths 94, 96 and 98 as shown in FIG. 5 represents a normal mode of operation. Data flow path 94 is via input into the RSM 100 and through DCAM 84 in slot 10 for signal processing. A RF signal is output from DCAM 84 into DCAM-PIC 102 and output into the HFC network. Likewise, data flow path 96 flows into the RSM 100 and through DCAM 80 in slot 11 and is forwarded as a RF signal to DCAM-PIC 104 and therefrom into the HFC network, and data flow path 98 flows into the RSM 100 and through DCAM 76 in slot 12 and is forwarded as a RF signal to DCAM-PIC 106 and therefrom into the HFC network. DCAM 72 is spare.

Figure 6:
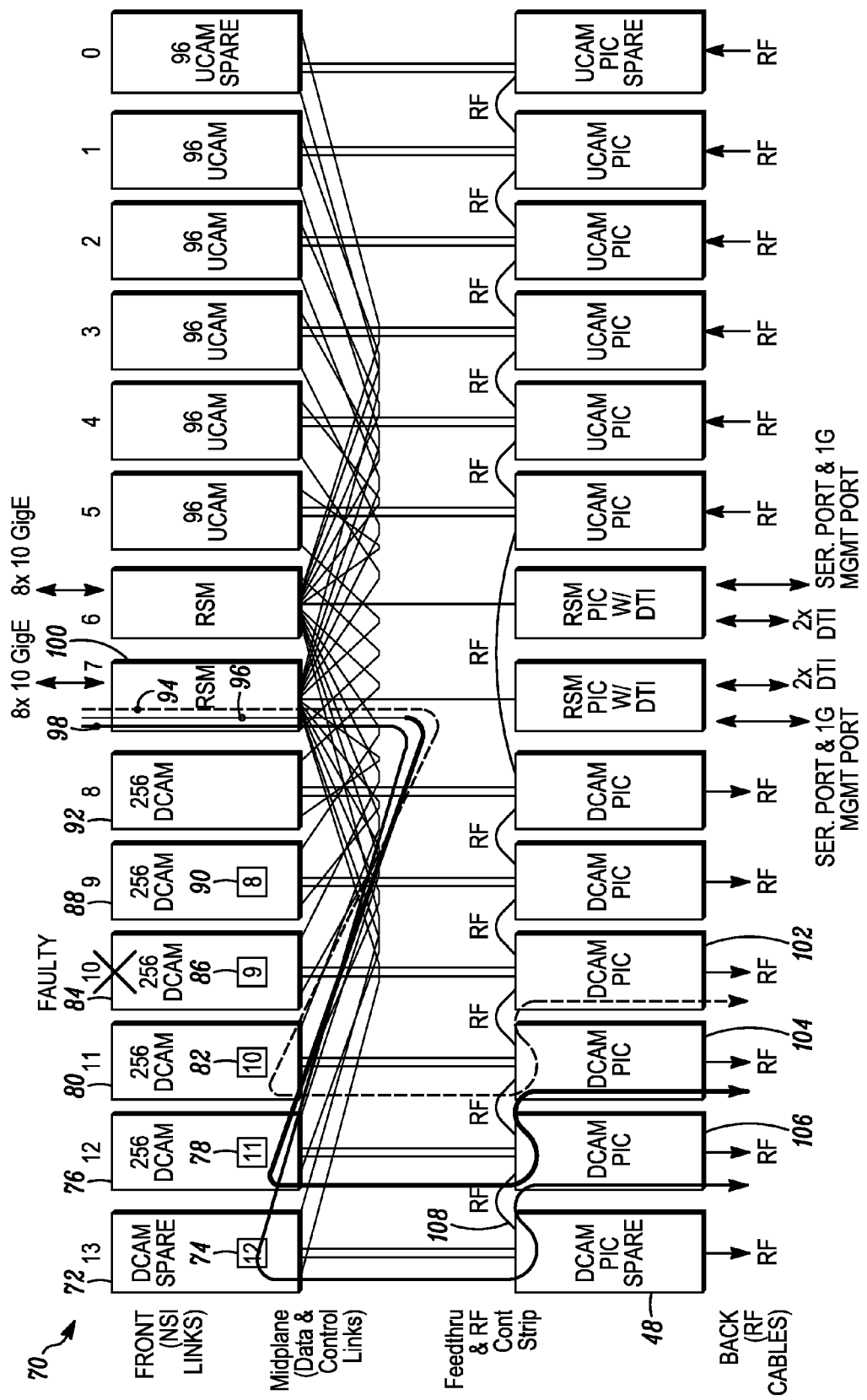
FIG. 6 is a block diagram of slot and mid-plane architecture of a CCAP device in a sparing event mode of operation in accordance with a second embodiment.

In FIG. 6, DCAM 84 in slot 10 is detected as faulty and is automatically switched out of service placing the device 70 in a sparing event mode of operation. According to the approach in this embodiment, all three paths 94, 96 and 98 into the DCAMs are each moved one DCAM to the left (as shown in the drawing) and thereby extends through a different DCAM. Thus, even though paths 96 and 98 are not associated with the faulty DCAM 84, these paths are still subject to a move to an adjacent DCAM.

For example, path 94 is switched into DCAM 80, path 96 is switched in DCAM 76, and path 98 is switched into spare DCAM 72. Thus, in this example, each DCAM to the left functions as a spare for the adjacent DCAM to the right. As a result, the RF signals from the DCAMs in flows 94, 96 and 98 flow through the corresponding DCAM-PIC and then through one hop or link of the daisy chain 108 before being output into the HFC network.

According to the apparatus and method disclosed in FIGS. 5 and 6, each card or DCAM spares for one other card or DCAM, such as an adjacent card or DCAM as defined by the daisy chain (i.e., adjacent with respect to the DCAM-PIC being only one hop or link away). As a result, the RF signals (even when being used for sparing) never propagates through more than a single hop or link in the daisy chain 108 thereby reducing signal attenuation and cross-talk noise generation. Thus, SNRs are inherently higher than SNRs experienced in the previously described sparing approach. Since RF signal attenuation is reduced, high-powered amplifiers are typically not required on the DCAMs to drive the RF signals (to compensate for the loss of the daisy chain), because there is very little loss in the daisy chain. This leads to lower board power requirements, less thermal issues, and lower cost of the DCAM.

Each of the DCAM cards in slots 9 through 13 of this embodiment is required only to store state information for a single active DCAM to its right within the sparing group. Thus, less state information is stored per DCAM which decreases memory requirements and thereby decreases the cost of the cards. Further, since the sparing DCAM is aware of the possible lone sparing assignment, the DCAM card can have some or all of the state information pre-loaded into stand-by registers within the hardware and processors. In hardware field-programmable gate arrays (FPGAs), these stand-by registers can be enabled using a multiplexer (MUX) that selects between only the one set of normal and one set of stand-by registers. In a processor, this stand-by information is similar to a thread waiting to be initiated within a processor, and once a sparing event is triggered, the DCAM card can instantly switch operation over to the stand-by information that is already pre-loaded in the stand-by registers. This leads to faster switch-over response since the transition occurs without delay.

In the embodiment disclosed in FIGS. 5 and 6, global router table (GLORT) values in the RSM 100 are modified to steer packets differently for all DCAM cards (i.e., to the left of the failing DCAM in the present example) whenever a sparing event occurs. Check-pointing of state information for each of the DCAM cards must be re-directed to the DCAM directly to the left of the card performing the check-pointing and not to the spare DCAM.

As shown in FIGS. 7-10, relays in the DCAM-DPICs are set differently depending upon the mode of operation, normal or sparing event. For instance, all DCAM-PICS to the left (in the example) of the failing DCAM must have relays set in the sparing event mode of operation that steers the RF signals from the sparing DCAM to a corresponding sparing DCAM-PIC and then to the DCAM-PIC to the right. While the sparing switch-over is predominantly hitless, there are always a few modems that may "fall out" of registration and require re-ranging and re-registration during a sparing event.

Figure 7:
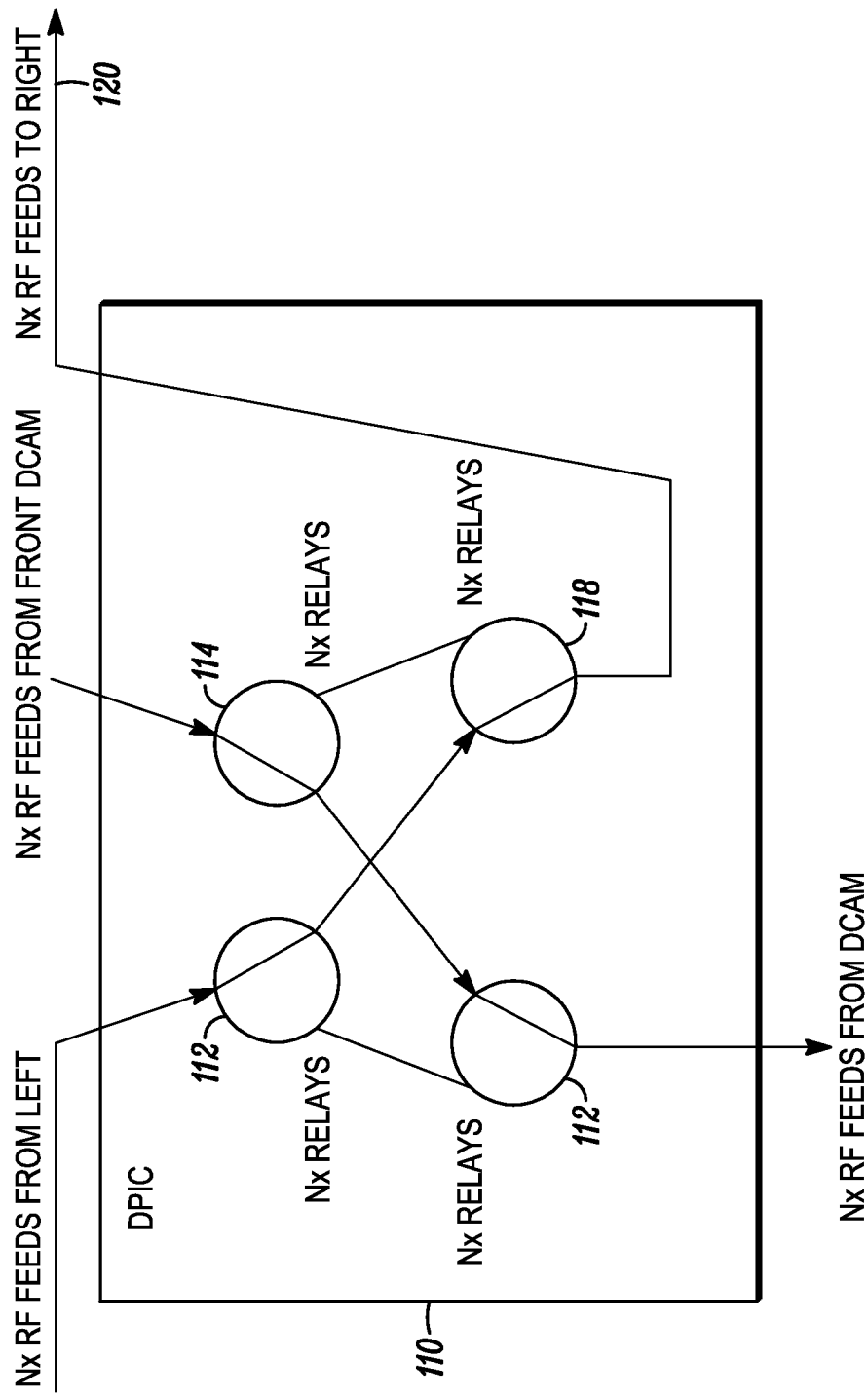
FIG. 7 is a diagram of input and output connections and relays of an interface card in a normal mode of operation in accordance with an embodiment.
Figure 8:
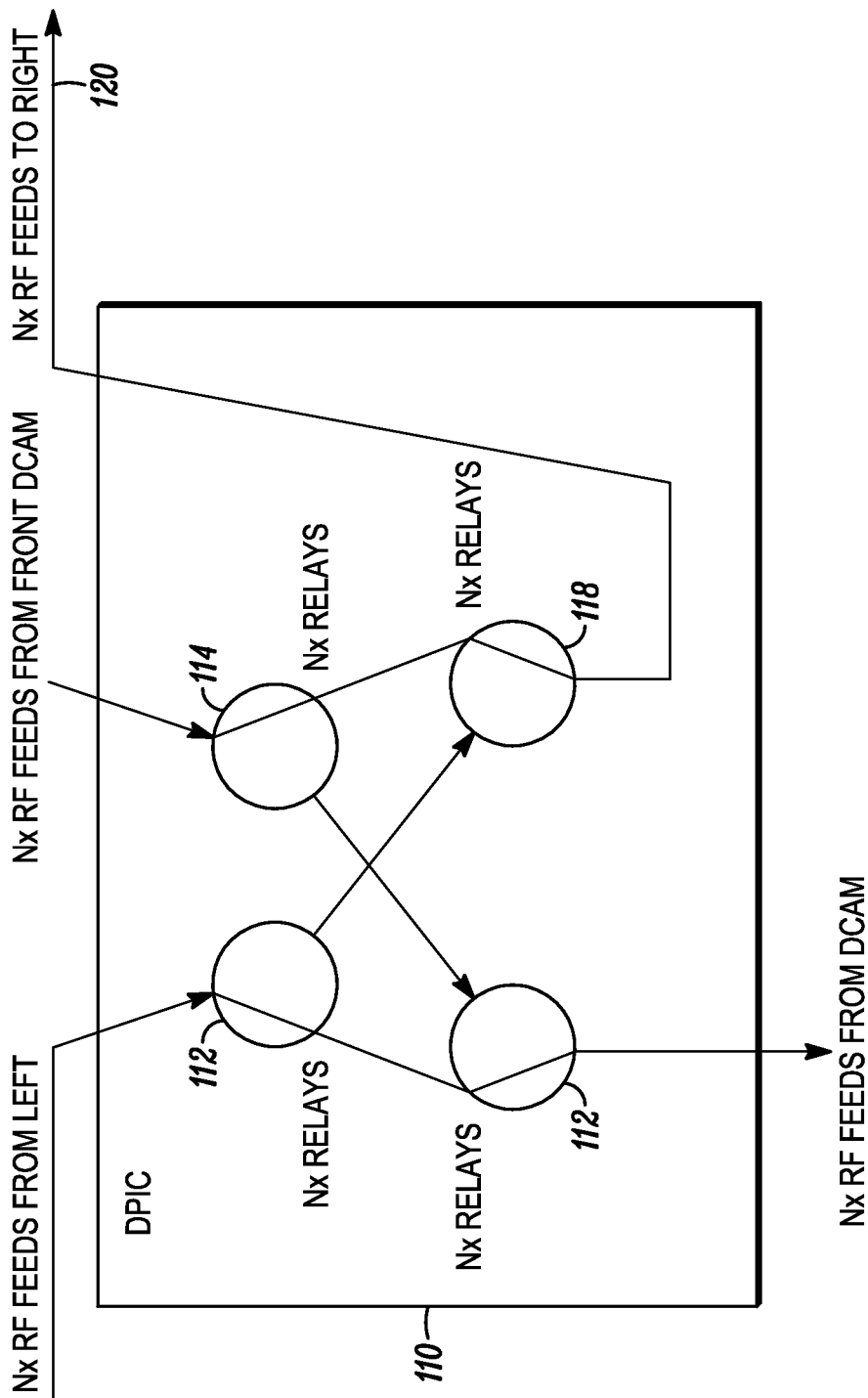
FIG. 8 is a diagram of input and output connections and relays of an interface card in a sparing event mode of operation in accordance with an embodiment.

FIG. 7 provides a first embodiment of relays in a DCAM-PIC 110 that is in a normal mode of operation. The DCAM-PIC 110 has four relays 112, 114, 116 and 118. Relays 114 and 116 are set to permit the RF feed from the corresponding DCAM to be output by DCAM-PIC 110 to the content distribution network. FIG. 8 shows the same DCAM-PIC 110 and relays 112, 114, 116 and 118 in a sparing event mode of operation. Here, the RF feed from an adjacent DCAM-PIC to the left (as viewed in the drawing) is caused to be output by the DCAM-PIC 110 by relays 112 and 116, and the RF feed from the corresponding DCAM in the DCAM/DCAM-PIC 110 pairing is caused to be forwarded onto the daisy chain 120 by relays 114 and 118 to a DCAM-PIC located to the right (as viewed in the drawing).

Figure 9:
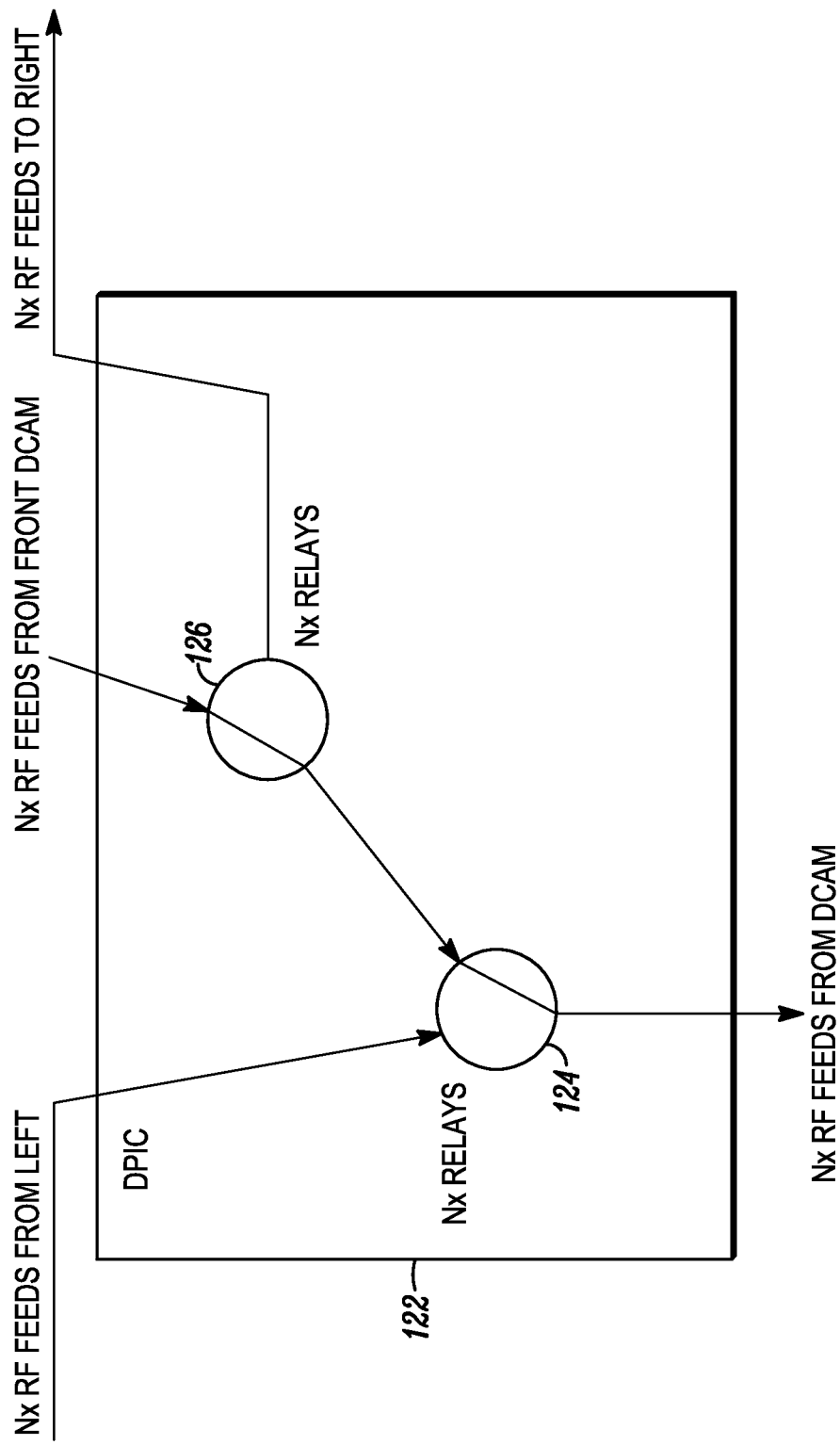
FIG. 9 is a diagram of input and output connections and relays of an interface card in a normal mode of operation in accordance with a second embodiment.
Figure 10:
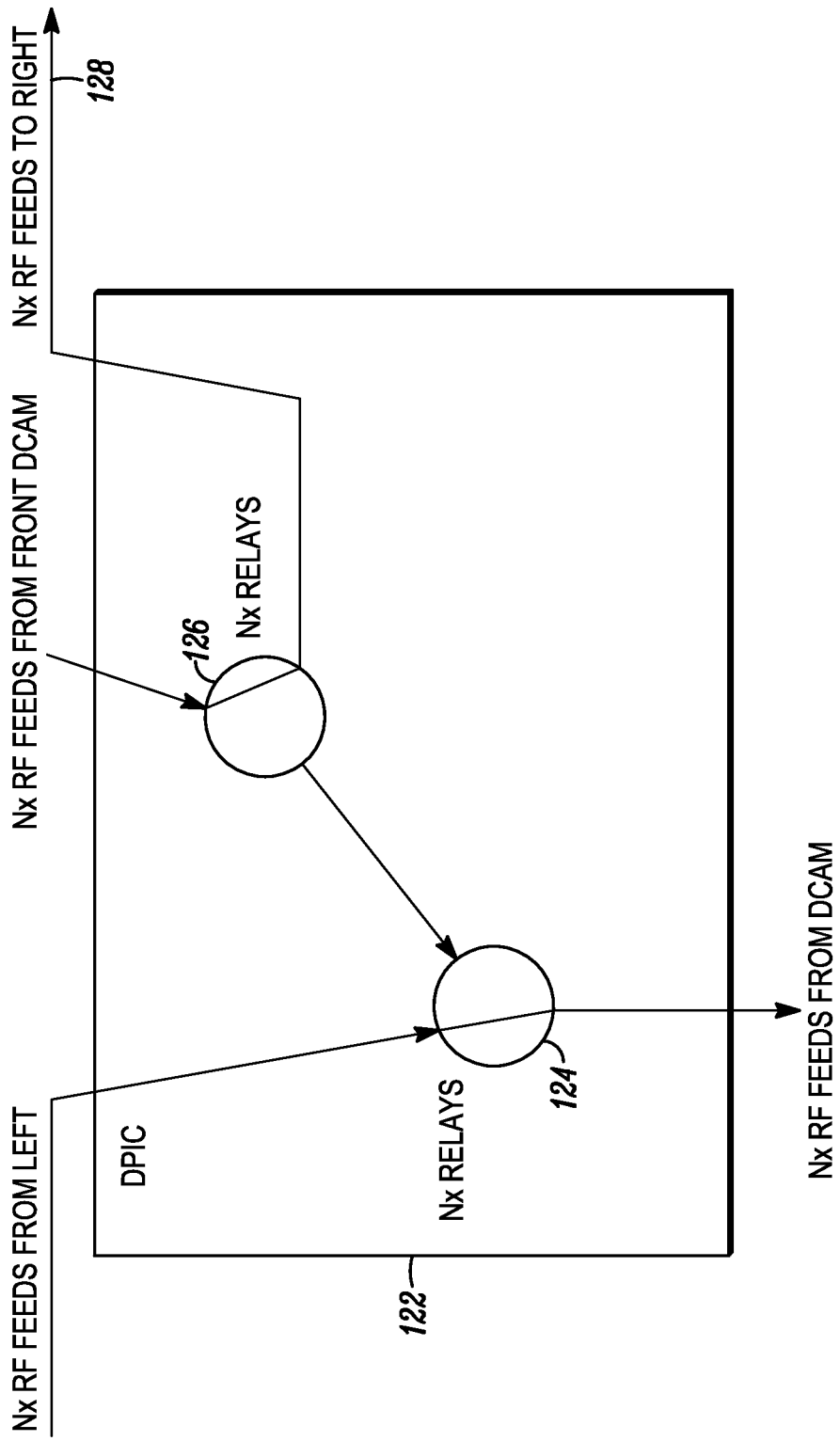
FIG. 10 is a diagram of input and output connections and relays of an interface card in a sparing event mode of operation in accordance with a second embodiment.

FIG. 9 provides a second embodiment of relays in a DCAM-PIC 122 that is in a normal mode of operation. The DCAM-PIC 122 has two relays 124 and 126. Relays 124 and 126 are set to permit the RF feed from the corresponding DCAM to be output by DCAM-PIC 122 to the content distribution network. FIG. 10 shows the same DCAM-PIC 122 and relays in a sparing event mode of operation. Here, the RF feed from an adjacent DCAM-PIC to the left (as viewed in the drawing) is caused to be output by the DCAM-PIC 122 by relay 124, and the RF feed from the corresponding DCAM in the DCAM/DCAM-PIC 122 pairing is caused to be forwarded onto the daisy chain 128 by relay 126 to a DCAM-PIC located to the right (as viewed in the drawing).

The embodiments disclosed herein are disclosed with respect to a content delivery network including a cable or HFC network. However, the embodiments can be applied to different types of content delivery networks as well as for other computer or telecommunication systems. In addition, each DCAM or circuit card in the sparing group may be identical with respect to signal processing capabilities or may have different capabilities. Further, although a downstream sparing group was described, the sparing approach can also be applied to an upstream sparing group. Still further, although a N+1 (i.e., 5 active to 1 spare) sparing group was disclosed, it is also possible to have more than one spare and to have each sparing DCAM include state information of the closest two adjacent DCAMs (within 2 hops or links of the daisy chain). In this case, the N+1 group can be referred to as a N+M sparing group (N=number of actives, M=number of spares), provided that M is at least one less than N. Thus, M can be one, two or greater provided that N is one or more greater than M.

In addition, the above referenced routers, access modules, interface cards, mid-plane, CCAP devices, CMTS devices, edge routers, electronic processing units, components, modules, equipment, boxes, and the like for carrying out the above methods can physically be provided on a circuit board or within another electronic device and can include various processors, microprocessors, controllers, chips, disk drives, memory and the like. It will be apparent to one of ordinary skill in the art that the processors, controllers, tuners, modules, managers, and other components may be implemented as electronic components, software, hardware or a combination of hardware and software.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention.

We claim:

1. A device for routing a plurality of separate flows of data to a plurality of subscribers on a content distribution network, comprising:

a group of access modules having signal processing circuitry each coupled to a corresponding interface unit, each of said access modules being coupled to a corresponding one of said interface units thereby forming a plurality of individual access module-to-interface unit pairs, and said interface units being coupled in a daisy chain configuration via a connecter strip;

said access modules including at least a first active access module, a second active access module, and a spare access module;

said group being configured for operation in a normal mode in which said first active access module is in service for processing a first flow of data and said second active access module is in service for processing a second flow of data; and said group being configured for operation in a sparing event mode in which, when said first active access module is removed from active service as being faulty, said first flow of data is automatically directed to said second active access module for processing and said second flow of data is automatically directed to said spare access module for processing.

2. The device according to claim 1, wherein, in said normal mode of operation, said second active access module has memory in a form of standby registers storing state information of the first active access module required to process said first flow of data during said sparing event mode and said spare access module has memory in a form of standby registers storing state information of said second active access module required to process said second flow of data during said sparing event mode.

3. A device according to claim 2, wherein said state information for said first flow of data includes channel configurations and active service flow configurations specific to said first flow of data, and wherein said state information for said second flow of data includes channel configurations and active service flow configurations specific to said second flow of data.

4. A device according to claim 3, wherein, during said sparing event mode, paths for each of said first and second flows of data travel through no more than one link of the daisy chain configuration.

5. A device according to claim 1, wherein said group of access modules includes N number of active access modules, where N equals three or more, and wherein, during said normal mode, at least N−1 of said N number of active access modules include state information in standby registers for another one of said N number of active access modules such that each of said N−1 active access modules is configured to function as a spare for processing a flow of data in said sparing event mode that is normally processed in said normal mode by said another one of said N number of active access modules.

6. A device according to claim 5, wherein said N number of active access modules and said spare access module are mounted in side-by-side arrangement in the device, wherein said N−1 active access modules are each configured to function as a spare for an adjacent active access module, and wherein said spare access module is configured to function as a spare only for an adjacent active access module.

7. A device according to claim 5, wherein said group of access modules includes M number of spare access modules, where M is less than N, wherein, during said normal mode, each of said spare access modules has state information stored in standby registers for no more than M number of active access modules.

8. A device according to claim 1, further comprising a controller configured to detect if said first and second access modules are faulty and configured to automatically cause a switch in operation from said normal mode to said sparing event mode when a fault is detected.

9. A device according to claim 1, wherein each of said access modules is provided in a form of a separate circuit card, each of said interface units is provided in a form of a separate physical interface card, and wherein each of said separate circuit cards and physical interface cards are coupled to a mid-plane circuit.

10. A device according to claim 1, wherein the device is selected from a group consisting of a converged cable access platform (CCAP) device, a cable modem termination system (CMTS), an edge router, and a quadrature amplitude modulation (QAM) router.

11. A device according to claim 10, wherein the content distribution network is a cable network, the access modules are downstream cable access modules, the interface units are downstream physical interface cards, and signals output from said downstream cable access modules and physical interface cards are radio frequency (RF) signals including modulated streams of data.

12. A device according to claim 11, wherein the modulated streams of data include at least one of digital video data and IP packeted data.

13. A method of providing routing services for a plurality of separate flows of data to a plurality of subscribers on a content delivery network, comprising the steps of:

arranging a group of access modules including a spare access module having signal processing circuitry each coupled to a corresponding interface unit, each of said access modules being coupled to a corresponding one of said interface units thereby forming a plurality of individual access module-to-interface unit pairs, and said interface units being coupled in a daisy chain configuration via a connecter strip;

during a normal mode of operation, processing a first flow of data with a first active access module and a second flow of data with a second active access module;

detecting for faulty access modules with a controller; and when the first access module is detected as being faulty by the controller, automatically switching to a sparing event mode in which said first flow of data is switched to said second active access module for processing and said second flow of data is switched to said spare access module for processing.

14. The method according to claim 13, further comprising the steps of storing state information corresponding to said first flow of data in standby registers of said second active access module before said switching step; and storing state information corresponding to said second flow of data in standby registers of said spare access module before said switching step; wherein said state information includes channel configurations and active service flow configurations.

15. A method according to claim 13, wherein, during said sparing event mode, paths for each of said first and second flows of data travel through no more than one link of the daisy chain configuration.

16. A method according to claim 13, wherein said group of access modules includes N number of active access modules, where N equals three or more, and wherein, during said normal mode, at least N−1 of said N number of active access modules include state information in standby registers for another one of said N number of active access modules such that each of said N−1 active access modules is configured to function as a spare for processing a flow of data in said sparing event mode that is normally processed in said normal mode by said another one of said N number of active access modules.

17. A method according to claim 16, wherein said N number of active access modules and said spare access module are mounted in a side-by-side arrangement, wherein said N−1 active access modules are each configured to function as a spare for an adjacent active access module, and wherein said spare access module is configured to function as a spare only for an adjacent active access module.

18. A method according to claim 16, wherein said group of access modules includes M number of spare access modules, where M is less than N, wherein, during said normal mode, each of said spare access modules has state information stored in standby registers for no more than M number of active access modules.

19. A method according to claim 13, wherein the group of access modules forms part of a device selected from a group consisting of a converged cable access platform (CCAP) device, a cable modem termination system (CMTS), an edge router, and a quadrature amplitude modulation (QAM) router.

20. A method according to claim 19, wherein the content distribution network is a cable network, the access modules are downstream cable access modules, the interface units are downstream physical interface cards, and signals output from said downstream access modules and physical interface cards are radio frequency (RF) signals including modulated streams of at least one of digital video data and IP packeted data.

\* \* \* \* \*